United States Patent
Hirooka et al.

(10) Patent No.: US 11,293,326 B2
(45) Date of Patent: Apr. 5, 2022

(54) EXHAUST GAS PURIFYING DEVICE FOR INTERNAL COMBUSTION ENGINE

(71) Applicant: TOYOTA JIDOSHA KABUSHIKI KAISHA, Toyota (JP)

(72) Inventors: Shigemasa Hirooka, Susono (JP); Shingo Korenaga, Shizuoka (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 17/118,018

(22) Filed: Dec. 10, 2020

(65) Prior Publication Data

US 2021/0215078 A1 Jul. 15, 2021

(30) Foreign Application Priority Data

Jan. 14, 2020 (JP) .............................. JP2020-003459

(51) Int. Cl.
*F01N 11/00* (2006.01)
*F01N 3/20* (2006.01)

(52) U.S. Cl.
CPC ............ *F01N 11/00* (2013.01); *F01N 3/2026* (2013.01); *F01N 3/2013* (2013.01); *F01N 2390/02* (2013.01); *F01N 2550/22* (2013.01)

(58) Field of Classification Search
CPC ...... F01N 3/027; F01N 3/2013; F01N 3/2026; F01N 11/00; F01N 2240/16; F01N 2550/22; F01N 2900/0602
See application file for complete search history.

(56) References Cited

U.S. PATENT DOCUMENTS

| 2012/0260638 A1* | 10/2012 | Yoshioka | F01N 11/00 60/295 |
| 2014/0292350 A1* | 10/2014 | Yoshioka | F01N 3/2853 324/551 |
| 2015/0007551 A1* | 1/2015 | Tanaka | F01N 11/00 60/274 |
| 2015/0285117 A1* | 10/2015 | Yoshioka | F01N 3/2853 73/114.75 |

FOREIGN PATENT DOCUMENTS

JP 2015-014253 A 1/2015

* cited by examiner

*Primary Examiner* — Jonathan R Matthias
(74) *Attorney, Agent, or Firm* — Finnegan, Henderson, Farabow, Garrett & Dunner, LLP

(57) ABSTRACT

An exhaust gas purifying device for an internal combustion engine includes: an electrically heated catalyst (EHC) including an insulating member; an insulation resistance detector; and a processor. The processor is configured to: acquire an insulation resistance value of the insulating member using the insulation resistance detector each time a trip of the vehicle starts; and execute diagnostic processing to diagnose the state of the EHC when the acquired insulation resistance value is equal to or less than a reference value. In the diagnostic processing, the processor is configured to determine whether or not there is an insulation abnormality of the EHC, based on an index value indicating the degree of decrease in an insulation resistance value of the insulating member of the current trip with respect to an insulation resistance value of the insulating member of one or more past trips including the last trip.

8 Claims, 7 Drawing Sheets

EXHAUST GAS PURIFYING DEVICE FOR INTERNAL COMBUSTION ENGINE

CROSS-REFERENCE TO RELATED APPLICATION

The present disclosure claims priority under 35 U.S.C. § 119 to Japanese Patent Application No. 2020-003459, filed on Jan. 14, 2020. The content of which is incorporated herein by reference in its entirety.

BACKGROUND

Technical Field

The present disclosure relates to an exhaust gas purifying device for an internal combustion engine, and more particularly to an exhaust gas purifying device including an electrically heated catalyst.

Background Art

For example, JP 2015-014253 A discloses a control device for an internal combustion engine including an electrically heated catalyst arranged in an exhaust gas passage. This electrically heated catalyst has a catalyst support that generates heat when energized, a case that houses the catalyst support, and an insulating member that is interposed between the catalyst support and the case. The control device determines whether or not the electrically heated catalyst has failed based on the record of changes in the insulation resistance of the insulating member.

Specifically, the control device described above determines that the electrically heated catalyst has failed when the change width (change amount) of the insulation resistance during a predetermined time period including at least the time period from when an ignition switch is turned on to the completion of warm-up of the electrically heated catalyst is equal to or less than a constant value.

The control device described above acquires an insulation resistance value at each of the following first to fifth timings during one trip of a vehicle in order to identify the cause of lowering the insulation resistance of the insulating member without raising the temperature of the electrically heated catalyst. The first timing is the timing at which the ignition switch is turned on. The second timing is the timing at which a catalyst warm-up process ends after the internal combustion engine is started. The third timing is the timing at which the warm-up of the electrically heated catalyst is completed. The fourth timing is the timing at which the warm-up of the internal combustion engine is completed. The fifth timing is the timing at which a predetermined time period has elapsed from the completion of warm-up of the internal combustion engine.

SUMMARY

In order to acquire an insulation resistance value by an insulation resistance detector, it is generally required to energize an electrically heated catalyst. Also, in order to diagnose the state of the electrically heated catalyst using the above-described method described in JP 2015-014253 A, it is necessary to acquire the insulation resistance values of the insulating member at a plurality of timings during one trip of the vehicle. Therefore, the method disclosed in JP 2015-014253 A still leaves room for improvement in terms of reducing the power consumption required for diagnosing the state of the electrically heated catalyst.

The present disclosure has been made in view of the problem described above, and an object of the present disclosure is to provide an exhaust gas purifying device for an internal combustion engine that can diagnose the state of an electrically heated catalyst while effectively reducing electric power consumption.

An exhaust gas purifying device for an internal combustion engine according to a first aspect of the present disclosure includes: an electrically heated catalyst including a heating element arranged in an exhaust gas passage of an internal combustion engine and configured to generate heat when energized to heat a catalyst, and an insulating member interposed between an inner wall of the exhaust gas passage and the heating element; an insulation resistance detector configured to detect an insulation resistance value of the insulating member; and a processor configured to execute processing for the electrically heated catalyst. Where a period from a start to a stop of a vehicle system of a vehicle on which the internal combustion engine is mounted is referred to as one trip, the processor is configured to: acquire an insulation resistance value of the insulating member using the insulation resistance detector each time a trip of the vehicle starts; and execute diagnostic processing to diagnose a state of the electrically heated catalyst when the acquired insulation resistance value is equal to or less than a reference value, and, in the diagnostic processing, the processor is configured to determine whether or not there is an insulation abnormality of the electrically heated catalyst, based on an index value indicating a degree of decrease in an insulation resistance value of the insulating member of a current trip with respect to an insulation resistance value of the insulating member of one or more past trips including a last trip.

The processor may be configured to execute the acquisition of the insulation resistance value of the insulating member at the start of the trip of the vehicle, before a start of the internal combustion engine. In the diagnostic processing, the processor may be configured, when the index value of a first trip is equal to or greater than a first threshold value and the index value of a second trip is less than the first threshold value, to determine that the insulation abnormality has occurred in the electrically heated catalyst. The second trip is a trip after the first trip and is a trip following a trip in which the internal combustion engine is operated until a warm-up of the internal combustion engine is completed.

In the diagnostic processing, the processor may be further configured, when the index value is less than a first threshold value, to determine that the insulation resistance value of the insulating member has decreased due to deposition of carbon on the insulating member.

The processor may be further configured, after determining that the insulation resistance value of the insulating member has decreased due to the deposition of the carbon on the insulating member, to execute carbon removal processing to remove the carbon deposited on the insulating member by controlling at least one of the electrically heated catalyst and an actuator of the internal combustion engine.

An exhaust gas purifying device for an internal combustion engine according to a second aspect of the present disclosure includes: an electrically heated catalyst including a heating element arranged in an exhaust gas passage of an internal combustion engine and configured to generate heat when energized to heat a catalyst, and an insulating member interposed between an inner wall of the exhaust gas passage and the heating element; an insulation resistance detector configured to detect an insulation resistance value of the insulating member; and a processor configured to execute processing for the electrically heated catalyst. Where a period from a start to a stop of a vehicle system of a vehicle on which the internal combustion engine is mounted is referred to as one trip, the processor is configured to: acquire an insulation resistance value of the insulating member using the insulation resistance detector each time a trip of the vehicle starts; and execute diagnostic processing to diagnose a state of the electrically heated catalyst when the acquired insulation resistance value is equal to or less than a reference value. In the diagnostic processing, the processor is configured to determine whether or not there is an insulation abnormality of the electrically heated catalyst, based on a ratio of a second decrease rate with respect to a first decrease rate. The first decrease rate is an absolute value of rate of decrease in an insulation resistance value of the insulating member of a last trip with respect to an insulation resistance value of the insulating member of a trip immediately before the last trip, and the second decrease rate is a rate of decrease in an insulation resistance value of the insulating member of a current trip with respect to the insulation resistance value of the last trip.

The processor may be configured to execute the acquisition of the insulation resistance value of the insulating member at the start of the trip of the vehicle, before a start of the internal combustion engine. In the diagnostic processing, the processor may be configured, when the ratio of a first trip is equal to or higher than a second threshold value and the ratio of a second trip is lower than the second threshold value, to determine that the insulation abnormality has occurred in the electrically heated catalyst. The second trip is a trip after the first trip and is a trip following a trip in which the internal combustion engine is operated until a warm-up of the internal combustion engine is completed.

In the diagnostic processing, the processor may be further configured, when the ratio is lower than a second threshold value, to determine that the insulation resistance value of the insulating member has decreased due to deposition of carbon on the insulating member.

The processor may be further configured, after determining that the insulation resistance value of the insulating member has decreased due to the deposition of the carbon on the insulating member, to execute carbon removal processing to remove the carbon deposited on the insulating member by controlling at least one of the electrically heated catalyst and an actuator of the internal combustion engine.

According to the exhaust gas purifying device for an internal combustion engine according to the first or second aspect of the present disclosure, each time a trip of the vehicle starts, the insulation resistance value of the insulating member is acquired using the insulation resistance detector. Then, the diagnostic processing is executed by using the above-described index value or ratio for evaluating the degree of decrease in the insulation resistance value between trips of the vehicle. Therefore, it is not necessary to acquire the insulation resistance value multiple times during one trip for the diagnostic processing. Therefore, the exhaust gas purifying device according to the first or second aspect of the present disclosure makes it possible to diagnose the state of the electrically heated catalyst (i.e., to determine whether or not there is an insulation abnormality) while effectively reducing the electric power consumption for the diagnosis.

DETAILED DESCRIPTION

It is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures, steps or the like that are described in conjunction with the following embodiments are not necessarily essential to the present disclosure unless explicitly shown otherwise, or unless the present disclosure is explicitly specified by the structures, steps or the like theoretically.

1. First Embodiment

A first embodiment according to the present disclosure will be described with reference to FIGS. 1 to 7.

1-1. Example of System Configuration

Figure 1:
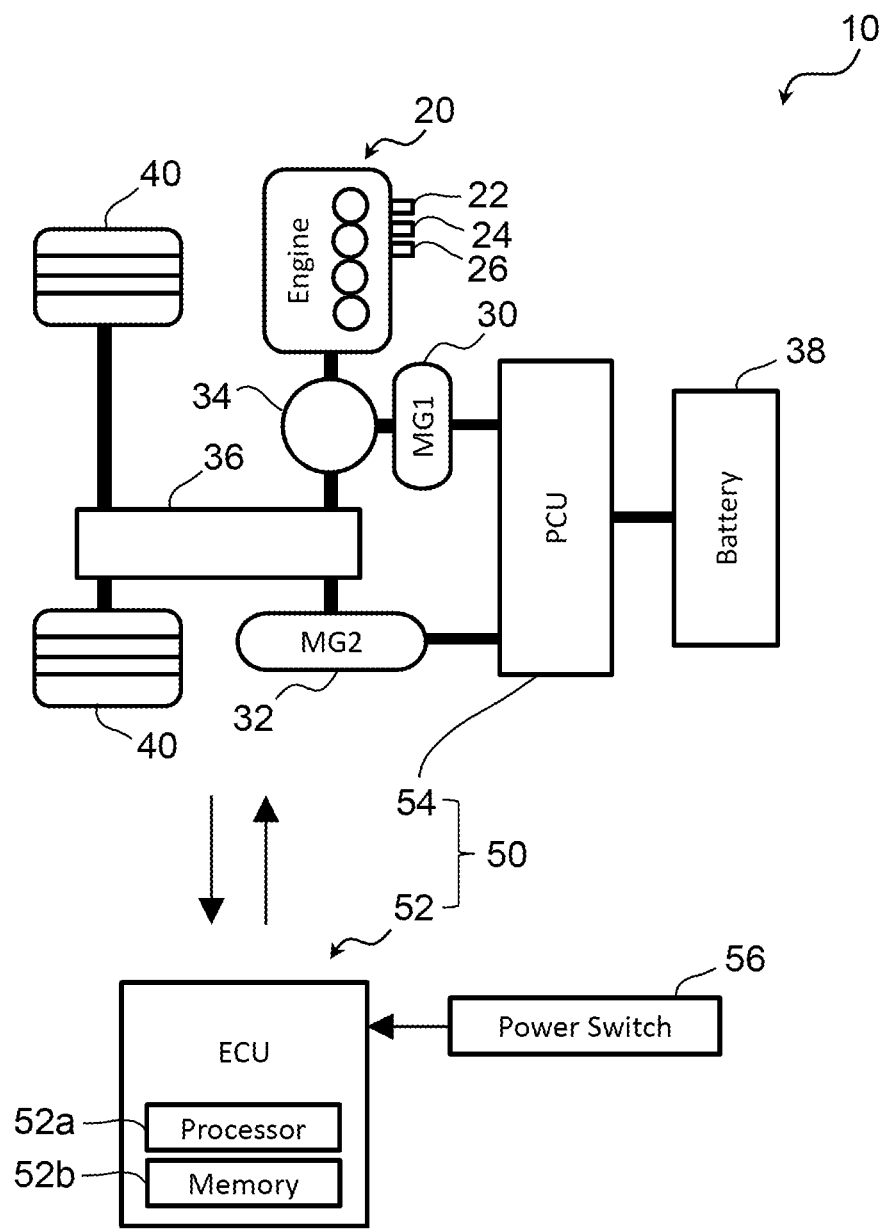
FIG. 1 is a schematic diagram showing a configuration of a powertrain system of a hybrid vehicle that is equipped with an exhaust gas purifying device of an internal combustion engine according to a first embodiment of the present disclosure.

FIG. 1 is a schematic diagram showing a configuration of a powertrain system 10 of a hybrid vehicle that is equipped with an exhaust gas purifying device of an internal combustion engine according to a first embodiment. The powertrain system 10 shown in FIG. 1 is configured as a power split type hybrid system as an example. The powertrain system 10 includes an internal combustion engine 20, a first motor generator 30 (MG1), a second motor generator 32 (MG2), a power split device 34, a speed reducer 36, a battery 38 and a control device 50.

The internal combustion engine 20 is a spark ignition type engine as an example, but may be a compression ignition type engine. The internal combustion engine 20 includes, as actuators for controlling the operation thereof, a fuel injection device 22 for supplying fuel to each cylinder and an ignition device 24 for igniting the air-fuel mixture in each cylinder. Each of the MG1 and MG2 is, for example, a three-phase AC type motor generator. The power split device 34 is, for example, a planetary gear unit and divides the torque generated by the internal combustion engine 20 (i.e., engine torque) into the MG1 and vehicle wheels 40. The MG1 is mainly used as a generator and generates electric power by using the engine torque. The electric power generated by the MG1 is directly supplied to the MG2 or stored in the battery 38. The MG2 is mainly used as an electric motor to drive the vehicle, and uses at least one of the electric power from the MG1 and the electric power of the battery 38 to drive the vehicle wheels 40 via the speed reducer 36.

The control device 50 is configured to control the internal combustion engine 20, the MG1 and the MG2. The control device 50 includes an electronic control unit (ECU) 52 and a power control unit (PCU) 54. The PCU 54 is a power converter that includes inverters for driving the MG1 and the MG2. The ECU 52 receives sensor signals from various sensors for controlling the operation of the powertrain system 10. The various sensors mentioned here includes a water temperature sensor 26 for detecting the temperature of the cooling water for cooling the internal combustion engine 20 (engine water temperature Tw). Moreover, the ECU 52 receives a signal from a power switch 56 for the driver of the vehicle on which the powertrain system 10 including the internal combustion engine 20 is mounted to start and stop of the vehicle system (including the powertrain system 10). The ECU 52 grasps the activation state of the vehicle system on the basis of the signal inputted from the power switch 56. A time period from the start to the stop of the vehicle system is herein referred to as "one trip" of the vehicle.

The ECU 52 includes a processor 52a and a memory 52b. The memory 52b stores various data including maps used for controlling the internal combustion engine 20, the MG1 and the MG2, and various control programs. The processor 52a reads out and executes a control program from the memory 52b, thereby realizing various kinds of processing and controls by the control device 50.

According to the powertrain system 10 configured as described above, by driving the MG2 using the electric power of the battery 38, it is possible to perform EV running in which the vehicle wheels 40 are driven by using only the MG2. It is also possible to perform hybrid running in which the vehicle wheels 40 are driven by both the internal combustion engine 20 and the MG2.

1-2. Examples of Configuration and Operation of EHC

Figure 2A:
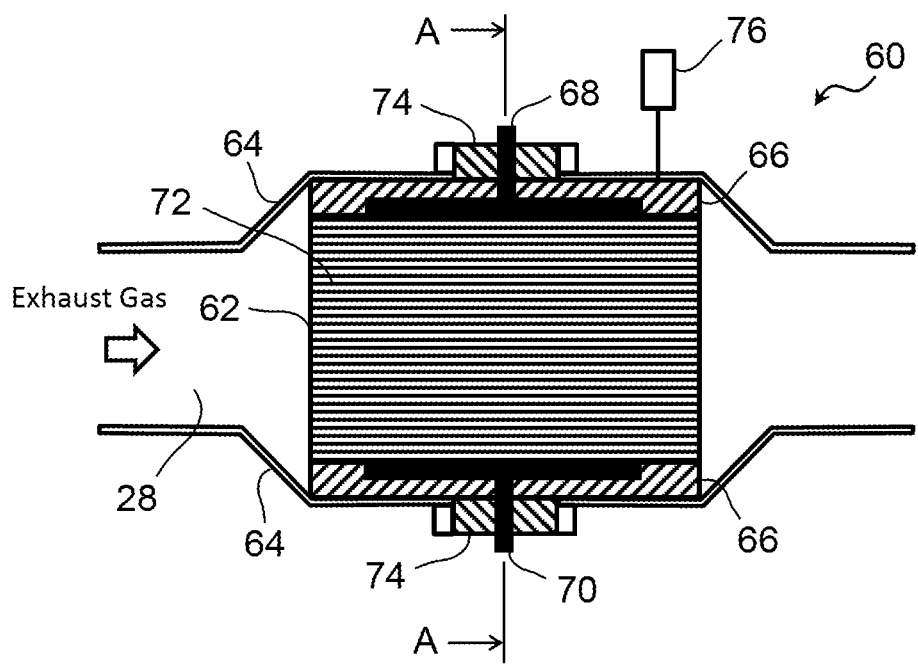
FIG. 2A is a schematic diagram showing a configuration of an electrically heated catalyst (EHC) included in the internal combustion engine shown in FIG. 1.
Figure 2B:
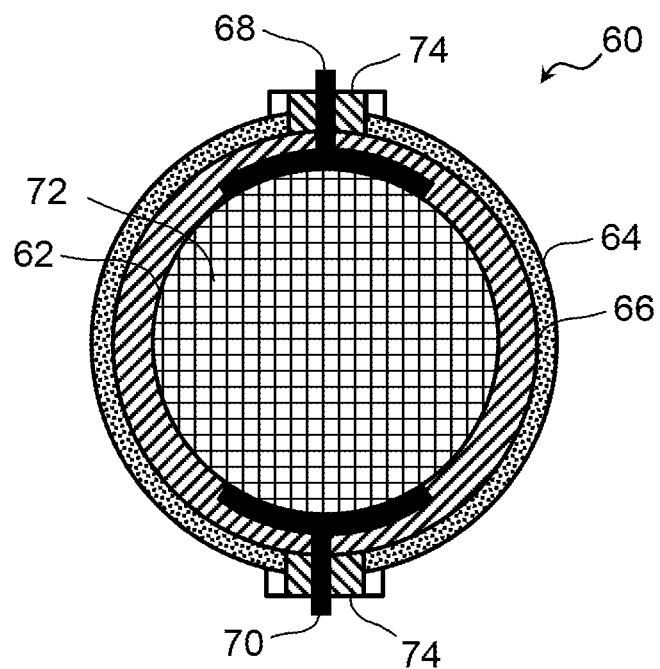
FIG. 2B is a schematic diagram showing the configuration of the electrically heated catalyst (EHC) included in the internal combustion engine shown in FIG. 1.

FIGS. 2A and 2B are schematic diagrams showing a configuration of an electrically heated catalyst (EHC) 60 included in the internal combustion engine 20 shown in FIG. 1. FIG. 2A shows a cross-sectional view of the EHC 60 along the flow direction of exhaust gas in the exhaust gas passage 28 of the internal combustion engine 20, and FIG. 2B shows a cross-sectional view of the EHC 60 along a line A-A in FIG. 2A.

As shown in FIG. 2A, the EHC 60 is arranged in the exhaust gas passage 28. The EHC 60 includes a catalyst support 62, a catalyst case 64, a holding mat 66 and a pair of electrodes 68 and 70. As shown in FIG. 2B, the catalyst support 62 has a honeycomb-shaped cross section as a cross section perpendicular to the flow direction of the exhaust gas, and supports a three-way catalyst 72. It should be noted that the catalyst supported on the catalyst support 62 is not limited to the three-way catalyst 72, and may be, for example, an oxidation catalyst, a storage and reduction type NOx catalyst or a selective catalytic reduction type NOx catalyst.

The catalyst support 62 is made of a material that generates heat as an electric resistance when energized. As the material of the catalyst support 62, for example, Sic (silicon carbide) can be used. The catalyst support 62 is housed in the catalyst case 64. The catalyst case 64 is made of metal (e.g., stainless steel), forms the housing of the EHC 60, and also functions as a part of the exhaust gas passage 28.

The holding mat 66 is interposed between the catalyst support 62 and the catalyst case 64 (i.e., an inner wall of the exhaust gas passage 28) in the catalyst case 64. The holding mat 66 is formed of an electrically insulating material. As the material for forming the holding mat 66, for example, a ceramic fiber containing alumina as a main component can be used. According to the holding mat 66, the catalyst support 62, which is energized for heating, can be electrically insulated from the catalyst case 64. It should be noted that the holding mat 66 corresponds to an example of the "insulating member" according to the present disclosure.

The electric power of the battery 38 is supplied to the catalyst support 62 via a pair of electrodes 68 and 70. To be more specific, the electrode 68 is a positive electrode for applying a positive voltage, and the electrode 70 is a negative electrode for applying a negative voltage. As shown in FIGS. 2A and 2B, the pair of electrodes 68 and 70 extend circumferentially and axially along the outer peripheral surface of the catalyst support 62 in order to allow the electric current to flow uniformly throughout the entire catalyst support 62. Furthermore, each of the electrodes 68 and 70 penetrates through the catalyst case 64. Between each of the electrodes 68 and 70 and the catalyst case 64, an insulator 74 made of an insulating material, such as alumina, is provided without a gap. Because of this, the electrodes 68 and 70 are electrically insulated from the catalyst case 64.

According to the EHC 60 having the configuration described above, the electric power of the battery 38 is supplied to the pair of electrodes 68 and 70, and the catalyst support 62 is thereby energized. When the catalyst support 62 generates heat by energization, the three-way catalyst 72 supported on the catalyst support 62 is heated. As a result, activation of the three-way catalyst 72 is promoted.

It should be noted that, in the example of the EHC 60 shown in FIGS. 2A and 2B, the catalyst support 62 corresponds to an example of the "heating element" according to the present disclosure. However, the heating element according to the present disclosure is not limited to the catalyst support as long as it is arranged in an exhaust gas passage of an internal combustion engine and heats a catalyst by generating heat when energized. Thus, the heating element may be, for example, a structure arranged upstream of the catalyst.

Figure 3:
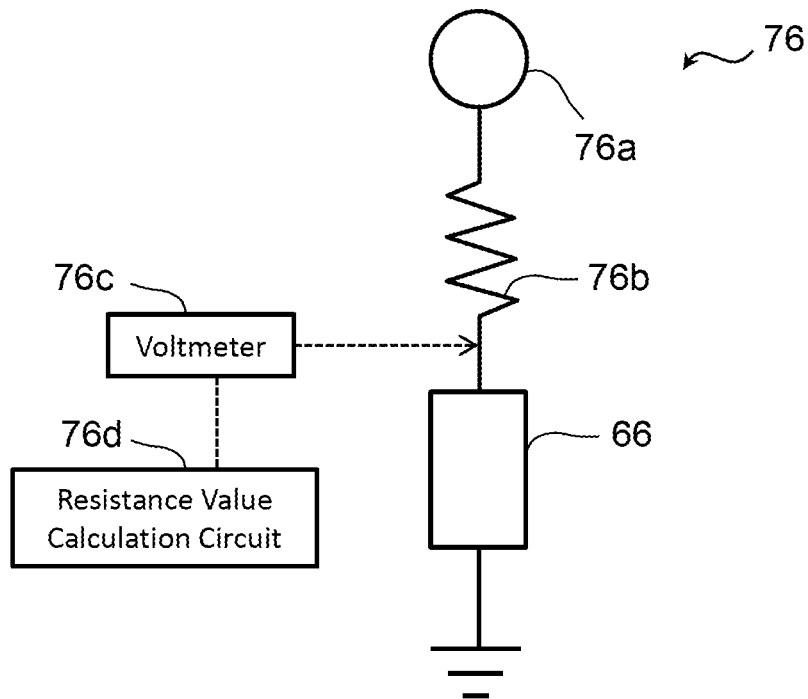
FIG. 3 is a diagram schematically showing a configuration example of an insulation resistance detector shown in FIG. 2A.

Furthermore, in the vicinity of the EHC 60, an insulation resistance detector 76 configured to detect an insulation resistance value Rt of the holding mat 66 (i.e., the insulating member) is disposed. FIG. 3 is a diagram schematically showing a configuration example of the insulation resistance detector 76 shown in FIG. 2A. The insulation resistance detector 76 includes a reference power supply 76a, a reference resistance 76b, a voltmeter 76c and a resistance value calculation circuit 76d. As shown in FIG. 3, the reference resistance 76b and the insulating member (holding mat 66) are connected with each other in series. The reference power supply 76a applies, to the reference resistance 76b and the holding mat 66, a reference voltage obtained by amplifying the voltage supplied from the battery 38. The voltmeter 76c measures a voltage at a position between the reference resistance 76b and the holding mat 66 when the reference voltage is applied to the reference resistance 76b and the holding mat 66 from the reference power supply 76a. The resistance value calculation circuit 76d calculates the insulation resistance value Rt of the insulating member (holding mat 66) on the basis of the voltage measured by the voltmeter 76c. The insulation resistance value Rt detected (calculated) by the insulation resistance detector 76 is outputted to the ECU 52. In this way, the electric power of the battery 38 is consumed in order to obtain the insulation resistance value R.

The EHC 60 is energized using a high voltage of the battery 38. It is stipulated by law that this kind of energization of the EHC 60 must be performed while ensuring the insulation performance of the EHC 60. Because of this, the ECU 52 (processor 52a) permits the energization to the EHC 60 when the insulation resistance value Rt is greater than a designated reference value A, and, on the other hand, prohibits the energization to the EHC 60 when the insulation resistance value Rt is less than or equal to the reference value A. In more detail, the reference value A is a value obtained by adding a designated margin to the value required by law with respect to the specification of the EHC 60 (such as the voltage to applied to the EHC 60) and is min, for example.

Figure 4:
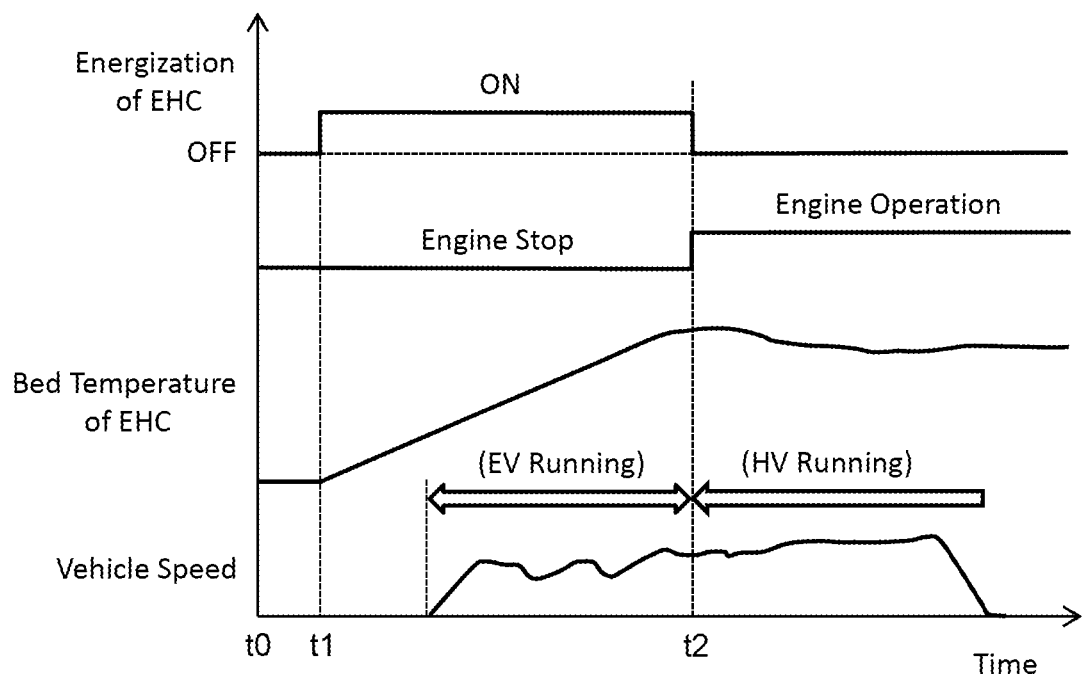
FIG. 4 is a time chart illustrating an example of energization operation under the condition that the energization to the EHC is permitted.

FIG. 4 is a time chart illustrating an example of the energization operation under the condition that the energization to the EHC 60 is permitted. In the present embodiment, as an example, the powertrain system 10 is mounted on a plug-in hybrid vehicle having a plug-in function that can externally charge the battery 38. FIG. 4 shows a typical running example after the start of a trip in the plug-in hybrid vehicle.

Specifically, when a trip is started, first, an EV running is performed by using the electric power that has been supplied to the battery 38 from the outside. Thereafter, when the remaining amount of the battery 38 (i.e., the charging rate SOC) decreases to a designated value or less, the switching to a hybrid running (HV running) in which the hybrid vehicle is driven using the internal combustion engine 20 together with the MG2 is performed. In order to enable the EHC 60 to quickly exert its exhaust gas purification performance from immediately after the switching to the HV running when the temperature (more specifically the bed temperature) of the EHC 60 is low, it is favorable to properly increase the temperature of the EHC 60 prior to the switching to the HV running (i.e., prior to the start of the internal combustion engine 20).

Accordingly, in the example shown in FIG. 4, after the vehicle system is activated at a time point t0, it is determined whether or not there is a request to energize the EHC 60. In the example of the plug-in hybrid vehicle, this energization request is issued when the internal combustion engine 20 needs to be started because the SOC is equal to or lower than the designated value described above, and the bed temperature of the EHC 60 is equal to or lower than a designated temperature. A time point t1 in FIG. 4 corresponds to the time point at which the energization to the EHC 60 is started in response to the energization request. The control of electrically heating the three-way catalyst 72 before the start of the internal combustion engine 20 in this way is referred to as "preheat control". With the start of the preheat control, the bed temperature of the EHC 60 rises. It should be noted that the SOC can be calculated based on, for example, the electric current flowing through the battery 38 that is detected by a current sensor (not shown). Also, the temperature (bed temperature) of the EHC 60 can be estimated based on, for example, the exhaust gas temperature at one or both of the upstream and downstream of the EHC 60 that is detected by a temperature sensor (not shown).

According to the preheat control, the energization to the EHC 60 is executed until a target electric energy Q0 depending on the bed temperature of the EHC 60 obtained when the energization request is issued is supplied to the EHC 60. A time point t2 in FIG. 4 corresponds to the time point at which the energization is stopped because the target electric energy Q0 has been supplied to the EHC 60. Furthermore, at this time point t2, the start-up of the internal combustion engine 20 is performed. It should be noted that the vehicle subject to the present disclosure includes not only the plug-in hybrid vehicle, but also a hybrid vehicle having no plug-in function, and a conventional vehicle powered only by an internal combustion engine. In the example of these vehicles other than the plug-in hybrid vehicle, the energization request of the EHC is issued when there is a request to start up the internal combustion engine and the bed temperature of the EHC becomes equal to or lower than a designated value.

Additionally, in the powertrain system 10 according to the present embodiment, the EHC 60, the insulation resistance detector 76 and the processor 52a of the ECU 52 correspond to an example of "the exhaust gas purifying device for an internal combustion engine" according to the present disclosure.

1-3. Diagnostic Processing of EHC

According to the present embodiment, the ECU 52 (processor 52a) acquires an insulation resistance value Rt by using the insulation resistance detector 76 each time the trip of the vehicle is started. In detail, the insulation resistance value Rt is acquired immediately after the start of each trip, for example. In addition, the acquisition of the insulation resistance value Rt is performed prior to the start-up of the internal combustion engine 20. Moreover, if the acquired insulation resistance value Rt is greater than the reference value A described above, the ECU 52 permits the energization of the EHC 60. If, on the other hand, the insulation resistance value Rt is equal to or less than the reference value A, the ECU 52 executes "diagnostic processing" to diagnose the state of the EHC 60.

1-3-1. Summary of Diagnostic Processing

In the diagnostic processing, the ECU 52 diagnoses the state of the EHC 60, based on "an index value indicating the degree of decrease" in an insulation resistance value Rtnow of the current trip with respect to an insulation resistance value Rtold of the most recent (i.e., the last) trip. According to the present embodiment, as an example of the index value according to the present disclosure, a decrease rate X1 (=1−Rtnow/Rtold) of the insulation resistance value Rtnow of the current trip with respect to the insulation resistance value Rtold of the most recent trip is used. More specifically, the index value described above is defined as a value that increases when the degree of decrease increases. In addition, the insulation resistance value Rt used in the present diagnostic processing is the same as that used in the above-described determination of whether or not the energization to the EHC 60 is permitted. Therefore, the insulation resistance value Rt used in the present diagnostic processing also corresponds to a value acquired prior to the start of the energization of the EHC 60 in a trip.

Figure 5:
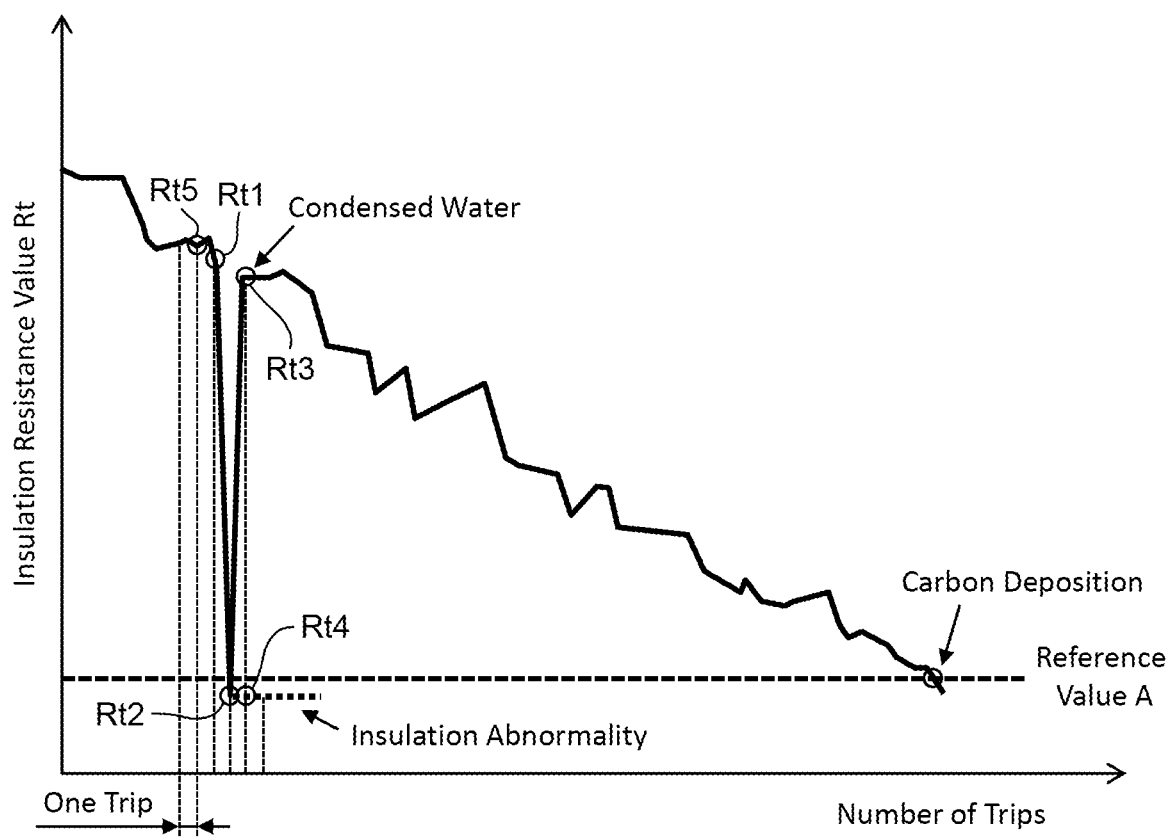
FIG. 5 is a graph showing a relationship between an insulation resistance value Rt and the number of trips of a vehicle.

FIG. 5 is a graph showing a relationship between the insulation resistance value Rt and the number of trips of the vehicle. More specifically, the insulation resistance value Rt on the vertical axis of FIG. 5 is a logarithmic display.

The following three causes can be cited as causes of lowering the insulation resistance value Rt. The exhaust gas contains condensed water. The first cause is the adhesion of condensed water to the holding mat 66 (insulating member). Also, carbon derived from exhaust gas may be deposited on the holding mat 66. The second cause is the deposition of carbon on the holding mat 66 (insulating member). The third cause is an insulation abnormality (i.e., a failure of the EHC 60) due to, for example, damage to the holding mat 66.

As shown in FIG. 5, the time-dependent change (i.e., the record) of the insulation resistance value Rt acquired for each trip is different depending on the causes that lower the insulation resistance value Rt. In detail, FIG. 5 shows that an insulation resistance value Rt2 of a certain trip has decreased significantly with respect to an insulation resistance value Rt1 of the previous trip and is below the reference value A. If there is an influence of condensed water or if an insulation abnormality occurs, the insulation resistance value Rt may decrease significantly between trips in this way.

However, when there is the influence of the condensed water, the decrease in the insulation resistance value Rt may be eliminated as a result of the internal combustion engine 20 being operated until the warm-up of the internal combustion engine 20 is completed. This is because the condensed water in the exhaust gas passage 28 evaporates when the engine operation is continued during the above-described certain trip at least until the warm-up of the internal combustion engine 20 is completed. The waveform shown by the solid line in FIG. 5 shows an example in which the influence of the condensed water is eliminated by the engine operation in the trip in which the insulation resistance value Rt2 is acquired, and an insulation resistance value Rt3 in the next trip recovers to a normal level higher than the reference value A.

When, on the other hand, the insulation resistance value Rt has decreased significantly between trips due to the insulation abnormality, as the waveform illustrated by the broken line in FIG. 5, an insulation resistance value Rt4 of the trip following the trip in which the insulation resistance value Rt2 was acquired remains lower than the reference value A without recover. Moreover, this also applies to subsequent trips.

Furthermore, the waveform by the solid line in FIG. 5 also shows how the insulation resistance value Rt decreases due to the influence of carbon deposition. When there is the influence of the carbon deposition, the insulation resistance value Rt does not change abruptly between trips, but gradually decreases when the number of trips increases as shown in FIG. 5.

In the diagnostic processing according to the present embodiment, considering that the manner of changing the insulation resistance value Rt for each trip is different depending on the causes as described above, the cause of lowering the insulation resistance is identified by using the following method.

(Identification of Insulation Abnormality)

According to the diagnostic processing, first, the ECU 52 (processor 52a) determines, as follows, that an insulation abnormality has occurred while distinguishing from the influence of condensed water and the influence of carbon deposition. More specifically, the ECU 52 determines that an insulation abnormality has occurred in the EHC 60 when the decrease rate X1 in a certain trip (first trip) is higher than or equal to a designated threshold value B and the decrease rate X1 in the second trip is lower than the threshold value B.

The second trip mentioned here is a trip after the first trip, and is a trip following the trip in which the internal combustion engine 20 is operated until the warm-up of the internal combustion engine 20 is completed. It should be noted that the threshold value B described above corresponds to an example of the "first threshold value" according to the present disclosure.

Additionally, the second trip is not limited to the next trip after the first trip. Moreover, whether or not the warm-up of the internal combustion engine 20 is completed can be determined based on, for example, whether or not the temperature of the internal combustion engine 20 (e.g., the engine water temperature Tw) becomes higher than a designated temperature threshold value (e.g., a threshold value T0 of the engine water temperature Tw). The threshold value T0 is, for example, 60° C. In addition, instead of the engine water temperature Tw, the temperature of the lubricating oil of the internal combustion engine 20 may be, for example, used as "the temperature of the internal combustion engine 20".

(Identification of Carbon Deposition)

Furthermore, according to the diagnostic processing, the ECU 52 (processor 52a) determines as follows that the insulating resistance value Rt has decreased due to the influence of the carbon deposition. That is, when the decrease rate X1 is lower than the threshold value B described above, the ECU 52 determines that the insulation resistance value Rt has decreased due to the deposition of carbon on the holding mat 66 (insulating member).

1-3-2. Carbon Removal Processing

After determining that the insulation resistance value Rt has decreased due to the carbon deposition, the ECU 52 (processor 52a) executes carbon removal processing to remove the carbon deposited on the holding mat 66 (insulating member) as represented by a flowchart shown in FIG. 7 which is described below. The specific content of the carbon removal processing is not particularly limited, but the carbon removal processing can be performed by controlling at least one of an actuator of the internal combustion engine 20 and the EHC 60. By removing the carbon, the insulation resistance value Rt can be recovered.

The "actuator" of the internal combustion engine 20 mentioned above is, for example, the fuel injection device 22 or the ignition device 24. For example, processing of controlling the ignition device 24 to retard the ignition timing of each cylinder corresponds to the carbon removal processing. By retarding the ignition timing to increase the temperature of the gas discharged from each cylinder, the temperature of the gas flowing into the EHC 60 can be increased to oxidize and remove the carbon. Moreover, for example, the following dither control using the fuel injection device 22 corresponds to the carbon removal processing. This dither control is to promote combustion in the exhaust gas passage 28 by, for example, making the air-fuel ratio of some cylinders lean and the air-fuel ratio of the remaining cylinders rich, or by, for example, switching the air-fuel ratio of all cylinders between a lean air-fuel ratio and a rich air-fuel ratio for each cycle. Even by this kind of method, the carbon can be oxidized and removed by increasing the temperature of the gas flowing into the EHC 60. Furthermore, the carbon removal processing may be performed such that the temperature of the EHC 60 is increased by energizing the EHC 60 to oxidize and remove the carbon, instead of or in addition to the method of using the actuator of the internal combustion engine 20 as in the examples described above.

1-3-3. Example of Processing Procedure by ECU (Processor)

Figure 6:
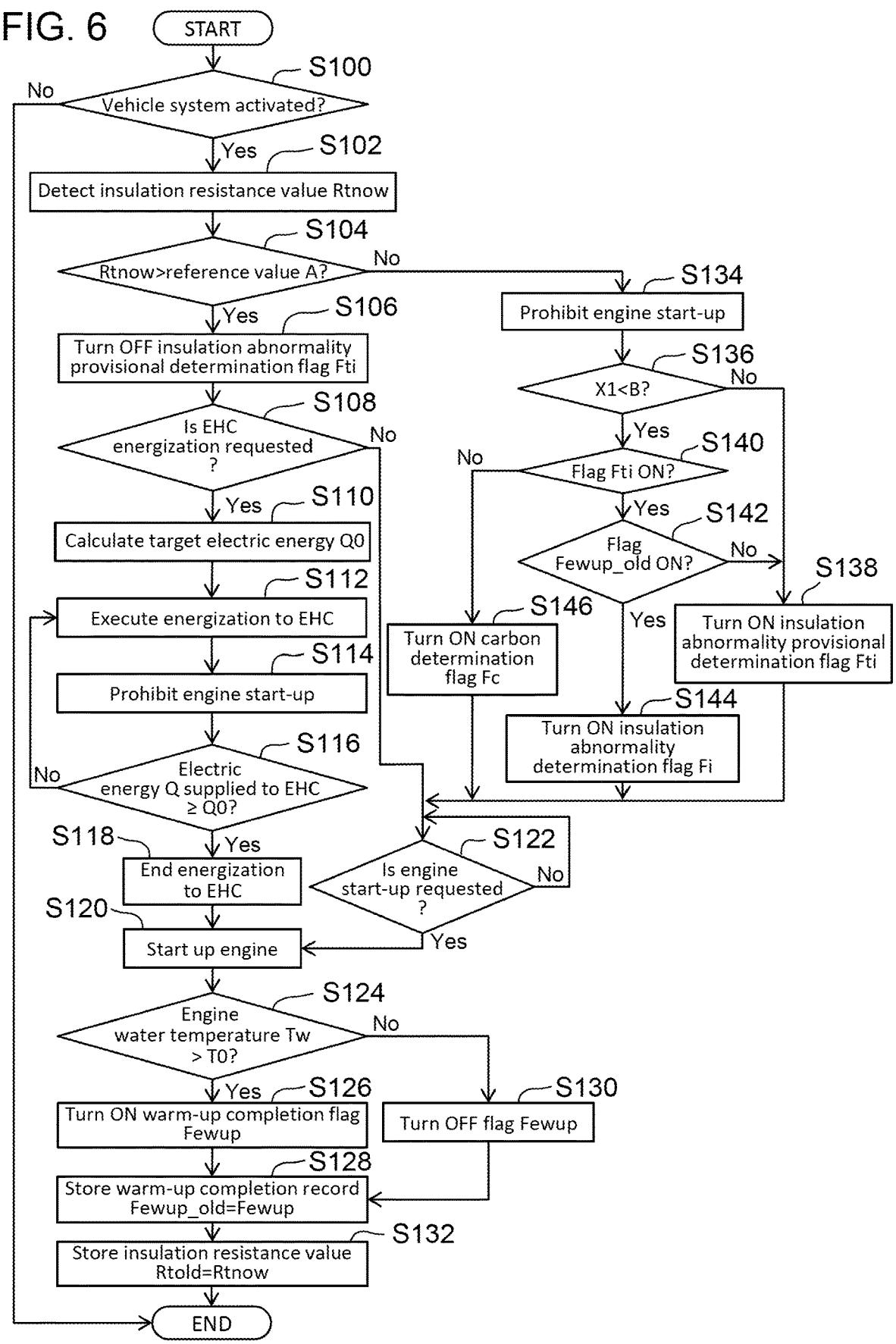
FIG. 6 is a flowchart showing the procedure of diagnostic processing and processing associated therewith according to the first embodiment of the present disclosure.

FIG. 6 is a flowchart showing the procedure of the diagnostic processing and the processing associated therewith according to the first embodiment.

As shown in FIG. 6, first, in step S100, the ECU 52 (processor 52a) determines whether or not the vehicle system is activated based on the operation of the power switch 56. The trip of the vehicle is started in response to the activation of the vehicle system as described above. In addition, in response to the activation of the vehicle system, the vehicle is ready to run (READY-ON state).

If the vehicle system is not activated in step S100, the ECU 52 ends the processing of this flowchart. If, on the other hand, the vehicle system is activated, the ECU 52 proceeds to step S102. In step S102, the ECU 52 uses the insulation resistance detector 76 to detect (acquire) the insulation resistance value Rtnow of the current trip. After the processing of step S102, the ECU 52 proceeds to step S104.

In step S104, the ECU 52 determines whether or not the insulation resistance value Rtnow acquired in step S102 is higher than the reference value A described above. As a result, if the insulation resistance value Rtnow is higher than the reference value A, that is, if the insulation resistance value Rtnow is normal, the ECU 52 proceeds to step S106.

In step S106, the ECU 52 turns off a provisional determination flag of the insulation abnormality. Then, the ECU 52 proceeds to step S108 and determines whether or not there is a request to energize the EHC 60. An example of the method of determining whether or not the energization request is present is as described with reference to FIG. 4. If there is the energization request, the ECU 52 execute the processing of steps S110-S118 in order to heat the EHC 60 prior to the start-up of the internal combustion engine 20.

In step S110, the ECU 52 calculates the target electric energy Q0 described above. The target electric energy Q0 is determined such that, for example, the lower the bed temperature of the EHC 60 when the energization request is issued is, the greater the target electric energy Q0 becomes. After step S110, the ECU 52 proceeds to step S112 and executes the energization to the EHC 60. Then, the ECU 52 proceeds to step S114, and prohibits the start-up of the internal combustion engine 20.

After step S114, the ECU 52 proceeds to step S116. In step S116, the ECU 52 determines whether or not the electric energy Q[kJ] supplied to the EHC 60 by energizing the EHC 60 by the processing of step S112 is equal to or greater than the target electric energy Q0 described above. This supplied electric energy Q can be calculated by integrating the electric power, which is the product of the electric voltage V applied to the EHC 60 and the electric current I flowing through the EHC 60, with the energization time t, as represented by the following Equation (1).

$$Q = \int V \cdot I \, dt \tag{1}$$

If the determination result of step S116 is negative—that is, if the supplied electric energy Q has not yet reached the target electric energy Q0, the ECU 52 continues to energize the EHC 60 while prohibiting the engine start-up (steps S112 and S114).

If, on the other hand, the determination result of step S116 is positive, that is, if the target electric energy Q0 has been supplied to the EHC 60, the ECU 52 proceeds to step S118 and ends the energization to the EHC 60. The ECU 52 then proceeds to step S120 to start up the internal combustion engine 20.

Moreover, if the ECU 52 determines in step S108 that there is no energization request, the ECU 52 proceeds to step S122 to determine whether or not there is a request to start up the internal combustion engine 20. Whether or not there is this engine start-up request is determined based on, for example, the SOC of the battery 38. The ECU 52 proceeds to step S120 after the engine start-up request is issued in step S122 and starts up the internal combustion engine 20.

After starting up the internal combustion engine 20 in step S120, the ECU 52 executes the processing of steps S124-S130 in order to determine whether or not the operation of the internal combustion engine 20 has been performed until the warm-up of the internal combustion engine 20 is completed during the current trip. First, in step S124, the ECU 52 determines whether or not the engine water temperature Tw has exceeded the above-described threshold value T0 during the current trip, based on the record of the engine water temperature Tw detected by the water temperature sensor 26 during the current trip.

If the determination result of step S124 is positive, the ECU 52 proceeds to step S126 and turns on an engine warm-up completion flag Fewup. Then, the ECU 52 proceeds to step S128, and stores the engine warm-up completion flag Fewup turned on in step S126 in the memory 52b as the last value Fewup_old.

If, on the other hand, the determination result of step S124 is negative, that is, if the internal combustion engine 20 is not operated until the warm-up of the internal combustion engine 20 is completed during the current trip, the ECU 52 proceeds to step S130, and turns off the engine warm-up completion flag Fewup. Then, the ECU 52 proceeds to step S128, and stores the engine warm-up completion flag Fewup turned off in step S130 in the memory 52b as the last value Fewup_old.

After the processing of step S128, the ECU 52 proceeds to step S132 and stores, as the last value Rtold, the insulation resistance value Rtnow acquired in step S102 at the start of the current trip.

Moreover, if in step S104, the insulation resistance value Rtnow is equal to or less than the reference value A, the ECU 52 proceeds to step S134 to prohibit the energization to the EHC 60, and then executes the processing of steps S136-S146, that is, the diagnostic processing described above.

Specifically, in step S136, the ECU 52 determines whether or not the above-described decrease rate X1 (=1−Rtnow/Rtold) is lower than the threshold value B. The decrease rate X1 used in this determination is calculated using the insulation resistance value Rtold of the most recent (i.e., the last) trip stored in step S132 and the insulation resistance value Rtnow of the current trip acquired in step S102.

If in step S136, the decrease rate X1 is equal to or higher than the threshold value B, the ECU 52 proceeds to step S138 and turns on the insulation abnormality provisional determination flag Fti. The reason is that it is not possible to determine whether the cause of lowering the insulation resistance value Rt is insulation abnormality or condensed water only by the fact that the insulation resistance value Rtnow becomes low at the decrease rate X1 of the threshold value B or more.

If, on the other hand, in step S136, the decrease rate X1 is lower than the threshold value B, the ECU 52 proceeds to step S140. In step S140, the ECU 52 determines whether or not the insulation abnormality provisional determination flag Fti is in the ON state. As a result, when the insulation abnormality provisional determination flag Fti is in the ON state, that is, when there is a record in which the decrease rate X1 is equal to or higher than the threshold value B in the last trip or a trip before the last trip, the ECU 52 then proceeds to step S142.

In step S142, the ECU 52 determines whether or not the engine warm-up completion flag Fewup_old is in the ON state. When the engine warm-up completion flag Fewup_old is in the OFF state, the internal combustion engine 20 is not operated until the engine warm-up is completed in the last trip. Thus, the influence of the condensed water cannot be eliminated as the cause of lowering the insulation resistance value Rt. Therefore, when the flag Fewup_old is in the OFF state, the ECU 52 proceeds to step S138 and keeps the insulation abnormality provisional determination flag Fti ON.

When, on the other hand, the engine warm-up completion flag Fewup is in the ON state, the internal combustion engine 20 is operated until the engine warm-up is completed in the last trip. Therefore, it can be found that the insulation resistance value Rtnow acquired at the start of the current trip is estimated to be a value without the influence of condensed water, and, in spite of that, this insulation resistance value Rtnow remains less than or equal to the reference value A and the decrease rate X1 is lower than the threshold value B. Therefore, when the flag Fewup is in the ON state, the ECU 52 proceeds to step S144 and turns on an insulation abnormality determination flag Fi. That is, the ECU 52 confirms the determination that the insulation abnormality has occurred. It should be noted that, the ECU 52 thereafter performs processing of notifying the driver of the vehicle of the failure (i.e., the insulation abnormality) of the EHC 60 (for example, turning on a warning light, displaying a warning message on a display device, or transmitting a warning sound).

Moreover, if, in step S140, the insulation abnormality provisional determination flag Fti is in the OFF state, that is, if there is no record in which the decrease rate X1 is equal to or higher than the threshold value B in the last trip or a trip before the last trip, the ECU 52 proceeds to step S146. When the flag Fti is in the OFF state, the insulation resistance value Rtnow is equal to or less than the reference value A without a steep decrease in the insulation resistance value Rt between trips. Thus, the ECU 52 turns on a carbon determination flag Fc. That is, the ECU 52 determines that the cause of lowering the insulation resistance value Rt is the carbon deposition on the holding mat 66 (insulating member).

After the determination processing of each of steps S138, S144 and S146, the ECU 52 proceeds to step S122. Then, the ECU 52 starts up the internal combustion engine 20 in step S120, provided that there is an engine start-up request in step S122.

Figure 7:
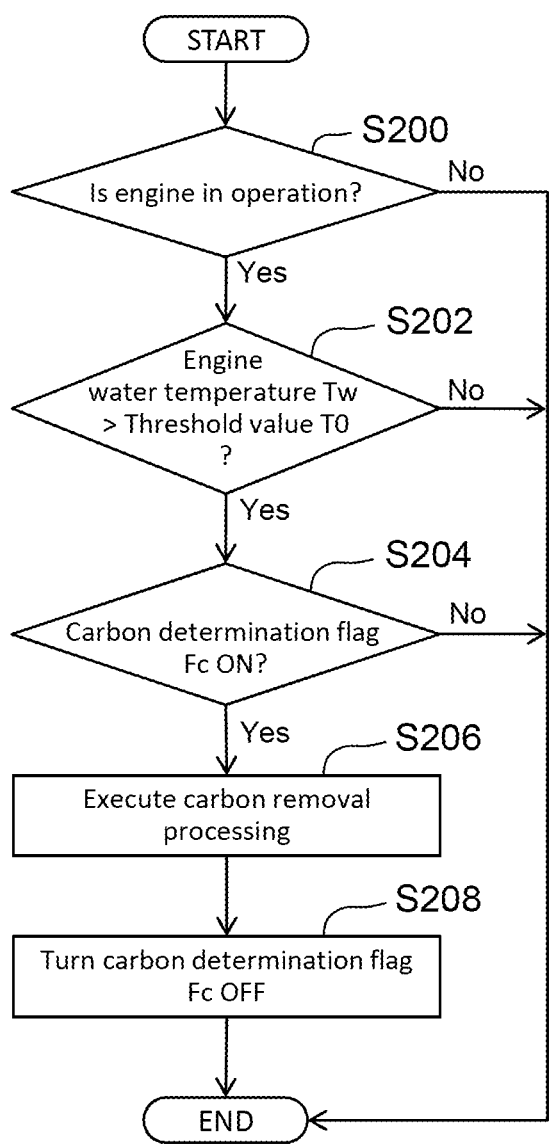
FIG. 7 is a flowchart showing the procedure of carbon removal processing and processing associated therewith according to the first embodiment of the present disclosure.

FIG. 7 is a flowchart showing the procedure of the carbon removal processing and the processing associated therewith according to the first embodiment. The processing of the present flowchart is executed in parallel with the processing of the flowchart shown in FIG. 6.

As shown in FIG. 7, first, in step S200, the ECU 52 (processor 52a) determines whether or not the internal combustion engine 20 is in operation. As a result, the ECU 52 ends the current processing of the flowchart when the internal combustion engine 20 is not in operation, and, on the other hand, proceeds to step S202 when the internal combustion engine 20 is in operation.

In step S202, the ECU 52 determines whether or not the engine water temperature Tw is higher than the threshold value T0 (that is, whether or not the warm-up of the internal combustion engine 20 has been completed). As a result, the ECU 52 ends the current processing of the flowchart when the warm-up of the internal combustion engine 20 is not completed, and, on the other hand, proceeds to step S204 when the warm-up of the internal combustion engine 20 is completed.

In step S204, the ECU 52 determines whether or not the carbon determination flag Fc described above is in the ON state. As a result, if the carbon determination flag Fc is in the OFF state, the ECU 52 ends the current processing of the flowchart. If, on the other hand, the carbon determination flag Fc is in the ON state, the ECU 52 proceeds to step S206 and executes the carbon removal processing described above.

After the carbon removal processing is executed, the ECU 52 proceeds to step S208 and turns off the carbon determination flag Fc.

1-4. Effect

According to the exhaust gas purifying device for the internal combustion engine 20 of the present embodiment described so far, the insulation resistance value Rtnow is acquired each time the trip of the vehicle is started. Then, when the acquired insulation resistance value Rtnow is equal to or less than the reference value A, the diagnostic processing is executed. In this diagnostic processing, the state of the EHC 60 is diagnosed based on the decrease rate X1, which is the index value indicating the degree of decrease in the insulation resistance value Rtnow of the current trip with respect to the insulation resistance value Rtold of the most recent (i.e., the last) trip. In this way, according to the present embodiment, the diagnostic processing is executed by using the degree of decrease in the insulation resistance value Rt between trips. As a result, it is not necessary to acquire the insulation resistance value Rt multiple times during one trip for the diagnostic processing. Therefore, the state of the EHC 60 can be diagnosed while effectively reducing the electric power consumed for the diagnosis. In addition, since the electric power of the battery 38 is generated by using the motive power of the internal combustion engine 20, fuel consumption can also be reduced in association with the reduction of the electric power consumption.

Furthermore, by acquiring the insulation resistance value Rt used in the present diagnostic processing prior to the engine start-up at each trip, the following effect can also be obtained. That is, the insulation resistance value Rt of the insulating member (holding mat 66) has a temperature characteristic, and becomes lower when the temperature is higher. During the operation of the internal combustion engine 20, the temperature of the exhaust gas flowing into the EHC 60 changes depending on the engine load used. As a result, the insulation resistance value Rt itself of the insulating member and also the electrical resistance value itself of the carbon deposited on the insulating member change under the influence of the change in the engine load. Therefore, by acquiring the insulation resistance value Rt used in the present diagnostic processing prior to the engine start-up, the state of the EHC 60 can be diagnosed by using the insulation resistance value Rt that is not affected by the change in the ermine load.

(Identification of Insulation Abnormality)

To be more specific, according to the diagnostic processing of the present embodiment, it is determined that the EHC 60 has an insulation abnormality when the decrease rate X1 in a certain trip (first trip) is equal to or higher than the threshold value B, and the decrease rate X1 in the second trip (that is, the trip after the first trip, which is the next trip after the trip in which the internal combustion engine 20 is operated until the warm-up of the internal combustion engine 20 is completed) becomes lower than the threshold value B. When the decrease rate X1 becomes equal to or higher than the threshold value B due to the influence of condensed water, the insulation resistance value Rt recovers to the normal level as a result of the internal combustion engine 20 being operated thereafter until the warm-up of the internal combustion engine 20 is completed (that is, until the internal combustion engine 20 is placed in a warm state). In contrast, when the insulation abnormality has occurred, even if the internal combustion engine 20 is placed in a warm state after the decrease rate X1 becomes equal to or higher than the threshold value B, the insulation resistance value Rt does not recover and remains low, and therefore, the decrease rate X1 becomes low. Because of this, the present diagnostic processing can determine that the insulation abnormality has occurred by using the decrease rate X1 between trips while distinguishing the insulation abnormality from the decrease in the insulation resistance value Rt due to the influence of condensed water. In addition, the insulation resistance value Rt used in the present diagnostic processing is acquired before the internal combustion engine 20 is started up in each trip. Because of this, even if the internal combustion engine 20 is started up in a cold state on the current trip, it is possible to acquire the insulation resistance value Rt of the trip without being affected by condensed water that may occur during the cold start. Therefore, it is possible to determine that an insulation abnormality has occurred while accurately distinguishing the insulation abnormality from the decrease in the insulation resistance value Rt due to the influence of condensed water.

(Identification of Carbon Deposition)

Moreover, according to the diagnostic processing of the present embodiment, when the decrease rate X1 is lower than the threshold value B described above, it is determined that the insulation resistance value Rt has decreased due to the deposition of carbon on the holding mat 66 (insulating member). The decrease in the insulation resistance value Rt due to the influence of the carbon deposition is different from both the decrease due to the influence of condensed water and the decrease due to the insulation abnormality, and as shown in FIG. 5, gradually progresses in association with an increase in the number of trips. Because of this, the present diagnostic processing can determine that a decrease in the insulation resistance value Rt due to the influence of the carbon deposition has occurred by using the decrease rate X1 between trips while distinguishing it from the decrease in the insulation resistance value Rt due to each of the influence of condensed water and the insulation abnormality. In addition, it is not necessary to perform processing similar to the carbon removal processing on a trial basis for the purpose of determining the decrease in the insulation resistance value Rt due to the influence of carbon deposition while distinguishing it from the decrease in the insulation resistance value Rt due to the insulation abnormality. Therefore, it is possible to execute the diagnostic processing while avoiding an increase in fuel consumption caused by the trial execution of the similar processing to the carbon removal processing for the diagnosis of the state of the EHC 60.

Furthermore, according to the present embodiment, the carbon removal processing is performed after it is determined by the above-described diagnostic processing that the insulation resistance value Rt of the holding mat 66 (insulating member) has decreased due to the deposition of carbon. As a result, the insulation resistance value Rt lowered by the deposition of carbon can be recovered to the normal level.

1-5. Modification Examples

In the first embodiment described above, the decrease rate X1 is used as an example of the index value described above. However, the index value may be any value "indicating the degree of decrease in the insulation resistance value of the insulating member of the current trip with respect to the insulation resistance value of the insulating member of one or more past trips including the most recent (i.e., the last) trip". That is, the index value may be, for example, the amount of decrease in the insulation resistance value Rtnow of the current trip with respect to the insulation resistance value Rtold of the most recent (i.e., the last) trip (=Rtold−Rtnow).

Additionally, with respect to the application to the diagnostic processing of the present embodiment, the decrease rate X1 is superior to the above-described amount of decrease in the following points. That is, as described above, the insulation resistance value Rt on the vertical axis of the graph in FIG. 5 is a logarithmic display. Because of this, as the waveform by the solid line in FIG. 5, the insulation resistance value Rt is represented to decrease substantially linearly in association with an increase in the number of trips under the logarithmic display. However, the amount of decrease in the insulation resistance value Rt between adjacent trips may greatly differs from each other depending on the level of the insulation resistance value Rt (e.g., between the insulation resistance value Rt obtained when no carbon is deposited and the insulation resistance value Rt near the reference value A). Therefore, it can be said that the decrease rate X1 is superior to the amount of decrease in evaluating the degree of decrease in the insulation resistance value Rt for each trip having this kind of characteristics.

Furthermore, the insulation resistance value Rtold of the past trip used in the calculation of the decrease rate X1 or the amount of decrease that are described above may be calculated using the insulation resistance values of a plurality of past trips including the most recent trip, instead of using only the value of the most recent (i.e., the last) trip. For example, the mean value of the insulation resistance values of a plurality of past trips may be used as the insulation resistance value Rtold.

2. Second Embodiment

Then, a second embodiment according to the present disclosure will be described with reference to FIG. 8. The second embodiment is different from the first embodiment in the details of diagnostic processing of the EHC 60 described below.

In the diagnostic processing according to the present embodiment, a ratio X2 is used instead of the decrease rate X1. Here, the decrease rate of the insulation resistance value Rtold1 of the last trip with respect to the insulation resistance value Rtold2 of the trip immediately before the last trip (=1−Rtold1/Rtold2) is referred to as a "first decrease rate", and the decrease rate of the insulation resistance value Rtnow of the current trip with respect to this insulation resistance value Rtold1 of the last trip (=1−Rtnow/Rtold1) referred to as a "second decrease rate". The ratio X2 is a ratio of the second decrease rate to the absolute value of the first decrease rate, as represented by the following Equation (2).

$$X2 = \frac{\text{Second Decrease Rate}}{|\text{First Decrease Rate}|} \quad (2)$$

A specific example of the ratio X2 will be described with reference to FIG. 5 described above. First, an example in which the insulation resistance value Rtnow of the current trip in FIG. 5 is the insulation resistance value Rt2 will be described. In this example, the insulation resistance value Rt1 corresponds to the insulation resistance value Rtold1 of the las trip, and the insulation resistance value Rt5 corresponds to the insulation resistance value Rtold2 of the trip immediately before the last trip. Because of this, as can be seen from FIG. 5, the value of the first decrease rate becomes small, and the value of the second decrease rate becomes great. As a result, the ratio X2 becomes high. Therefore, when the ratio X2 is high, it can be determined that the insulation resistance value Rt is rapidly decreased between the last trip and the current trip.

Next, an example in which the insulation resistance value Rt4 obtained when the insulation abnormality has occurred in FIG. 5 is the insulation resistance value Rtnow of the current trip. In this example, the absolute value of the decrease rate (first decrease rate) of the insulation resistance value Rt2 of the last trip with respect to the insulation resistance value Rt1 of the trip immediately before the last trip becomes great, and the value of the decrease rate (second decrease rate) of the insulation resistance value Rt4 of the current trip with respect to the insulation resistance value Rt2 of the last trip becomes small. As a result, the ratio X2 becomes low. Moreover, when the insulation abnormality has occurred, the ratios X2 of trips following the trip in which the insulation resistance value Rt4 is acquired are also low. Therefore, even by the diagnostic processing according to the present embodiment using the ratio X2 instead of the decrease rate X1, it can be determined that, by performing the diagnostic processing in the procedure similar to that in the first embodiment as in a flowchart shown in FIG. 8 described below, the insulation abnormality has occurred while distinguishing the insulation abnormality from the decrease in the insulation resistance value Rt due to the influence of the condensed water.

Furthermore, under the condition that the insulation resistance value Rt gradually decreases in association with an increase in the number of trips due to the influence of carbon deposition, the first decrease rate and the second decrease rate are close to each other, and therefore, the ratio X2 defined as described above becomes low. Therefore, even by the diagnostic processing according to the present embodiment using the ratio X2 instead of the decrease rate X1, it can be determined that the insulation resistance value Rt has decreased due to the influence of the carbon deposition while distinguishing it from the decrease in the insulation resistance value Rt due to each of the influence of condensed water and the insulation abnormality, as in the flowchart shown in FIG. 8 described below.

Figure 8:
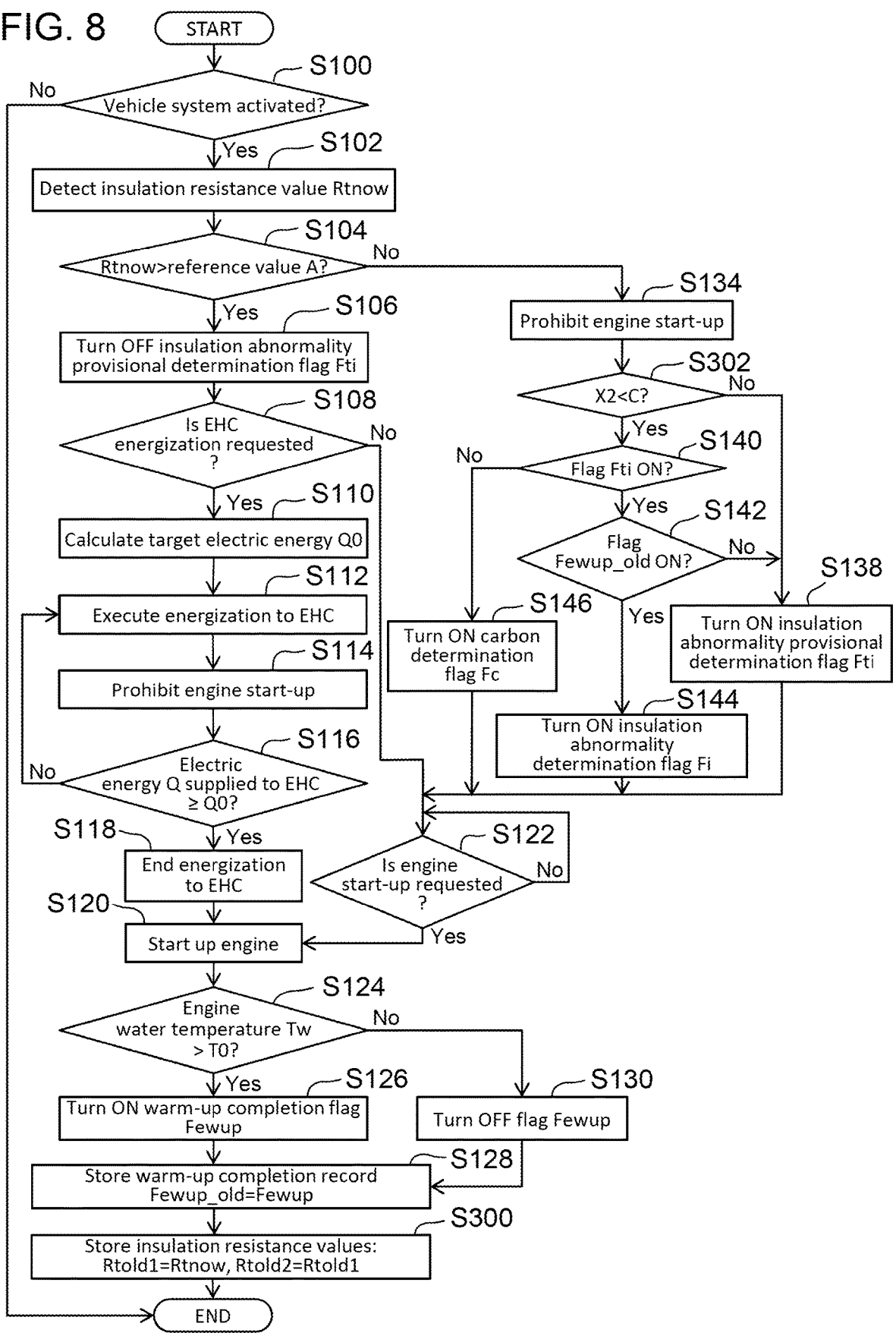
FIG. 8 is a flowchart showing the procedure of diagnostic processing and processing associated therewith according to a second embodiment of the present disclosure.

FIG. 8 is the flowchart showing the procedure of the diagnostic processing and the processing associated therewith according to the second embodiment. The processing of the present flowchart is as described above in the first embodiment, except that steps S132 and S136 are replaced with steps S300 and S302, respectively.

In step S300 shown in FIG. 8, the ECU 52 (processor 52a) stores, as the value Rtold2 of the trip immediately before the last trip, the last value Rtold1 stored at the time of the last trip, and stores, as the last value Rtold1, the insulation resistance value Rtnow acquired in step S102 at the time of the start of the current trip.

Furthermore, in step S302, the ECU 52 determines whether or not the ratio X2 described above is lower than a designated threshold value C. The ratio X2 used for this determination is calculated using the last value Rtold1 and the value Rtold2 of the trip immediately before the last trip that are stored in step S300, and the insulation resistance value Rtnow of the current trip acquired in step S102. The threshold value C described above corresponds to an example of the "second threshold value" according to the present disclosure.

As described so far, even by the diagnostic processing according to the second embodiment, considering the characteristic of the time-dependent change of the insulation resistance value Rt between trips that differs depending on the cause of decreasing the insulation resistance value Rt, the cause of the decrease can be identified.

The embodiments and modification examples described above may be combined in other ways than those explicitly described above as required and may be modified in various ways without departing from the scope of the present disclosure.

What is claimed is:

1. An exhaust gas purifying device for an internal combustion engine, the exhaust gas purifying device comprising:
   an electrically heated catalyst including a heating element arranged in an exhaust gas passage of an internal combustion engine and configured to generate heat when energized to heat a catalyst, and an insulating member interposed between an inner wall of the exhaust gas passage and the heating element;
   an insulation resistance detector configured to detect an insulation resistance value of the insulating member; and
   a processor configured to execute processing for the electrically heated catalyst, wherein
   where a period from a start to a stop of a vehicle system of a vehicle on which the internal combustion engine is mounted is referred to as one trip, the processor is configured to:
   acquire an insulation resistance value of the insulating member using the insulation resistance detector each time a trip of the vehicle starts; and
   execute diagnostic processing to diagnose a state of the electrically heated catalyst when the acquired insulation resistance value is equal to or less than a reference value, and
   in the diagnostic processing, the processor is configured to determine whether or not there is an insulation abnormality of the electrically heated catalyst, based on an index value indicating a degree of decrease in an insulation resistance value of the insulating member of a current trip with respect to an insulation resistance value of the insulating member of one or more past trips including a last trip.

2. The exhaust gas purifying device according to claim 1, wherein
   the processor is configured to execute the acquisition of the insulation resistance value of the insulating member at the start of the trip of the vehicle, before a start of the internal combustion engine, in the diagnostic processing, the processor is configured, when the index value of a first trip is equal to or greater than a first threshold value and the index value of a second trip is less than the first threshold value, to determine that the insulation abnormality has occurred in the electrically heated catalyst, and the second trip is a trip after the first trip and is a trip following a trip in which the internal combustion engine is operated until a warm-up of the internal combustion engine is completed.

3. The exhaust gas purifying device according to claim 1, wherein in the diagnostic processing, the processor is further configured, when the index value is less than a first threshold value, to determine that the insulation resistance value of the insulating member has decreased due to deposition of carbon on the insulating member.

4. The exhaust gas purifying device according to claim 3, wherein the processor is further configured, after determining that the insulation resistance value of the insulating member has decreased due to the deposition of the carbon on the insulating member, to execute carbon removal processing to remove the carbon deposited on the insulating member by controlling at least one of the electrically heated catalyst and an actuator of the internal combustion engine.

5. An exhaust gas purifying device for an internal combustion engine, the exhaust gas purifying device comprising:

an electrically heated catalyst including a heating element arranged in an exhaust gas passage of an internal combustion engine and configured to generate heat when energized to heat a catalyst, and an insulating member interposed between an inner wall of the exhaust gas passage and the heating element;

an insulation resistance detector configured to detect an insulation resistance value of the insulating member; and a processor configured to execute processing for the electrically heated catalyst, wherein where a period from a start to a stop of a vehicle system of a vehicle on which the internal combustion engine is mounted is referred to as one trip, the processor is configured to:

acquire an insulation resistance value of the insulating member using the insulation resistance detector each time a trip of the vehicle starts; and execute diagnostic processing to diagnose a state of the electrically heated catalyst when the acquired insulation resistance value is equal to or less than a reference value, in the diagnostic processing, the processor is configured to determine whether or not there is an insulation abnormality of the electrically heated catalyst, based on a ratio of a second decrease rate with respect to a first decrease rate, and the first decrease rate is an absolute value of rate of decrease in an insulation resistance value of the insulating member of a last trip with respect to an insulation resistance value of the insulating member of a trip immediately before the last trip, and the second decrease rate is a rate of decrease in an insulation resistance value of the insulating member of a current trip with respect to the insulation resistance value of the last trip.

6. The exhaust gas purifying device according to claim 5, wherein the processor is configured to execute the acquisition of the insulation resistance value of the insulating member at the start of the trip of the vehicle, before a start of the internal combustion engine, in the diagnostic processing, the processor is configured, when the ratio of a first trip is equal to or higher than a second threshold value and the ratio of a second trip is lower than the second threshold value, to determine that the insulation abnormality has occurred in the electrically heated catalyst, and the second trip is a trip after the first trip and is a trip following a trip in which the internal combustion engine is operated until a warm-up of the internal combustion engine is completed.

7. The exhaust gas purifying device according to claim 5, wherein in the diagnostic processing, the processor is further configured, when the ratio is lower than a second threshold value, to determine that the insulation resistance value of the insulating member has decreased due to deposition of carbon on the insulating member.

8. The exhaust gas purifying device according to claim 7, wherein the processor is further configured, after determining that the insulation resistance value of the insulating member has decreased due to the deposition of the carbon on the insulating member, to execute carbon removal processing to remove the carbon deposited on the insulating member by controlling at least one of the electrically heated catalyst and an actuator of the internal combustion engine.

* * * * *